F. H. VAN HOUTEN.
DRIVING MECHANISM.
APPLICATION FILED JUNE 7, 1913.
1,140,319. Patented May 18, 1915.
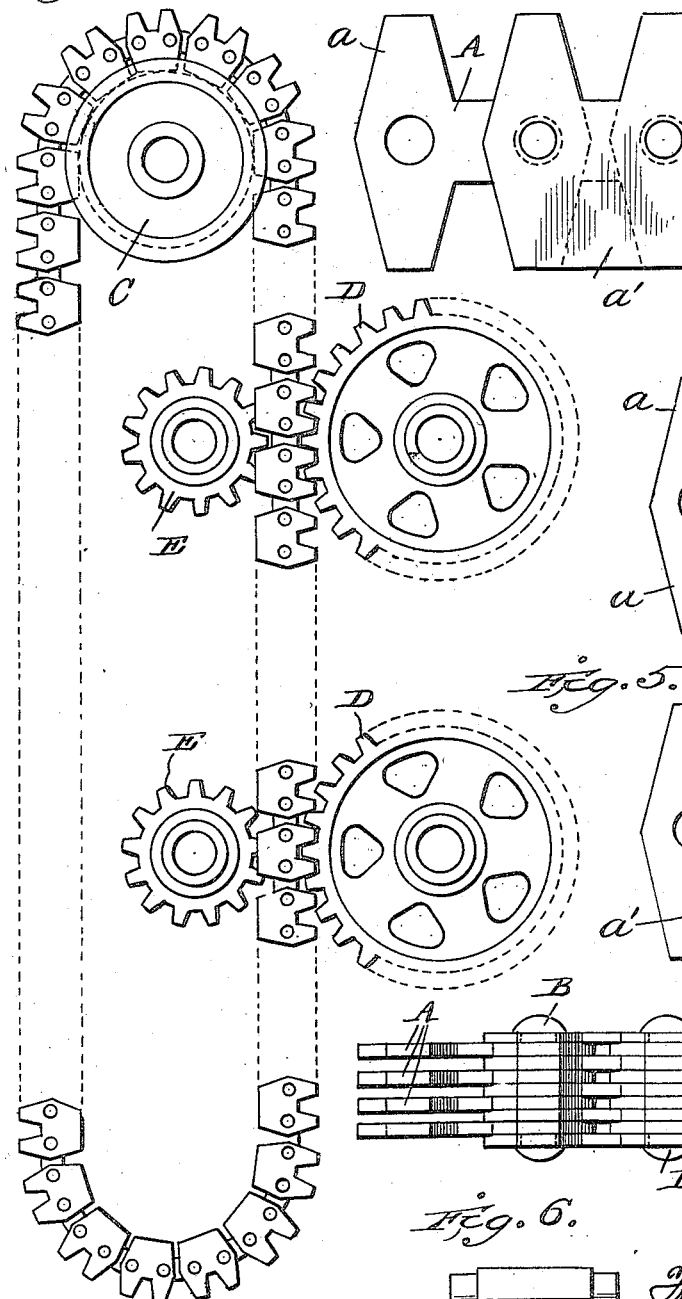
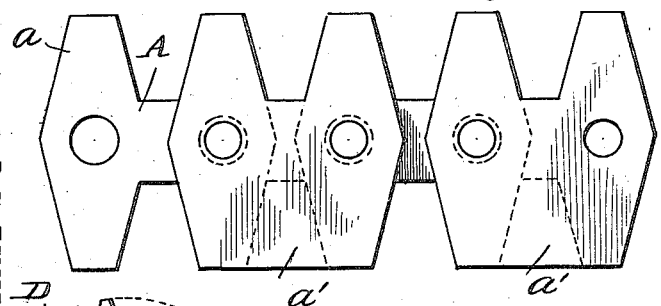
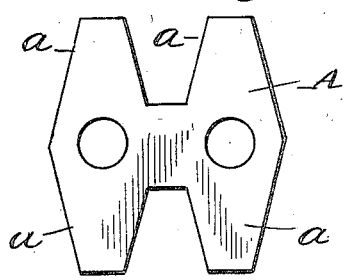
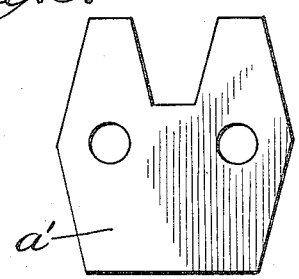
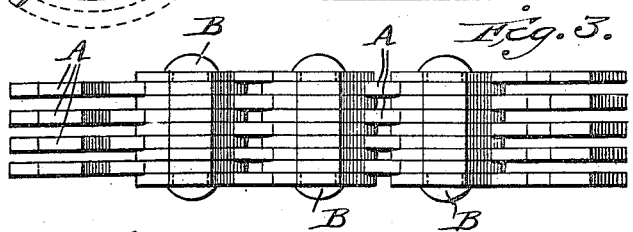

UNITED STATES PATENT OFFICE.

FRANK H. VAN HOUTEN, OF FISHKILL-ON-THE-HUDSON, NEW YORK.

DRIVING MECHANISM.

1,140,319.　　　　　　Specification of Letters Patent.　　Patented May 18, 1915.

Application filed June 7, 1913.　Serial No. 772,441.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Driving Mechanism; and I do hereby declare the following to be a full, clear, and exact description of the same, reference being had to the accompanying drawings, forming part of this specification, and to the figures and letters of reference marked thereon.

This invention relates to driving mechanism or mechanism for transmitting power from one moving part to another, the invention being particularly designed for effecting the rotation of a series of pairs of wheels or rollers, such, for example, as are employed for operating the horizontal belts in a dough proofing cabinet, where the surface speed of the several parts is to be maintained substantially uniform.

One object of the invention is to provide a driving mechanism with which any number of pairs of wheels may be operated at a uniform speed without transmitting the power through intermediate gear wheels whereby the effect of cumulative lost motion is obviated and whereby the driven parts may be individually of light and small proportions.

Referring to the accompanying drawings,—Figure 1 is an elevation showing two pairs of wheels with their driving mechanism arranged in accordance with the present invention, the supporting frame, etc., being entirely omitted. Fig. 2 is a detail elevation on an enlarged scale of a small section of the flexible rack which constitutes the member for transmitting motion to and between successive pairs of wheels. Fig. 3 is a plan of the section of flexible rack shown in Fig. 2. Figs. 4 and 5 are views of two of the links of which the flexible rack is composed. Fig. 6 is a detail of one of the pivot pins or pintles for joining the links.

Like letters of reference in the several figures indicate the same parts.

The driving mechanism of the present invention embodies essentially a flexible rack which is distinguished from a sprocket chain in that it is incompetent for coöperation with a sprocket wheel around which it may pass and is only adapted for transmitting power in a straight line. In other words, the links of which the flexible rack is composed are provided with rack teeth, the operative faces of which cannot be made to conform with the operative faces of the sprocket wheel to effect an economical and effective transmission of power to or from said wheel. This flexible rack is illustrated in the accompanying drawings as composed of a series of relatively thin H-shaped links A, Fig. 4, the spaces between the legs of the tooth extensions *a* being cut to conform to standard gear tooth practice, and the ends of the links are formed at angles corresponding to the angles of the surface between the tooth extensions *a* whereby when the links are assembled, as shown in Figs. 1 and 2, and extended in a straight line, there is formed a true rack bar which, however, is flexible inasmuch as the several links are assembled, as shown in Fig. 3, on transverse pivot pins or pintles B, Fig. 6, the axes being coincident with the intersection of the axes of the tooth extensions and the longitudinal axes of the links, as will be readily understood from an inspection of Fig. 4.

By reason of the spaces between the ends of adjacent links lying end to end, the flexible rack may be bent on a comparatively short radius and it is conveniently supported in operative position by an idler sheave or pulley C, Fig. 1, on which it is freely suspended, the lower part of the rack forming a pendent loop below the sheave.

The pairs of wheels or rollers, one pair of which may be drivers, are arranged on opposite sides of one reach of the rack. Thus, as shown in Fig. 1, each pair of wheels is composed of a large gear wheel D and a small gear wheel or pinion E arranged with their teeth in mesh with the oppositely projecting teeth of the rack bar. The pairs of wheels are arranged with the spaces between the wheels of succeeding pairs in alinement with each other, whereby the rack, throughout that portion under tension in transmitting the power from one pair of wheels to the other, is maintained in a straight line and will deliver the power with practically no loss due to the angular position of the operative teeth with relation to the axes of the wheels.

In the preferred construction, the rack bar is maintained in its proper engagement with the wheels by forming the pinions or small gear wheels E of slightly less thickness than the thickness of the rack bar and in forming the edge links of the rack bar which project toward the smaller gear wheels solid or without the intermediate recesses as shown, for example, at a' in Figs. 2 and 5. Corresponding links to that shown in Fig. 5 are provided on opposite edges of the rack bar, as shown in Fig. 3, and consequently one or more of the teeth of the smaller gear wheels are always confined between the solid portions a' of the edge links and displacement of the rack bar longitudinally of the axis of the gear wheels is thereby prevented. This construction, however, if followed on both sides of the rack bar would be a disadvantage, inasmuch as it often becomes desirable to separate the rack bar and wheels with which it is in mesh. Such a construction would require the complete disassembling of the machine. With the construction shown, however, any pair of wheels may be disconnected by simply loosening one of the wheels D, for example, on its shaft and shifting the same longitudinally of its axis out of mesh with the rack bar, whereupon the rack bar may be deflected away from the wheel E and the latter disconnected from its shaft and removed.

In assembling the several links of which the rack bar is composed, the pivots or pintles B are preferably headed up so as to clamp the edge links, Fig. 5, whereby each pair of edge links is formed into a rigid structure, the intermediate links being pivotally connected therewith by being journaled on the pintles B. This construction prevents edgewise distortion of the rack bar and makes a more rigid and effective structure.

The formation of the edge links without the tooth recesses on one side of the rack bar, as shown in Fig. 5, not only retains the rack bar positively in engagement with the sprocket wheels, but the edges of these edge links serve a useful function in supporting the rack bar on its carrying sheave or idler, for as will be seen by an inspection of Fig. 1, the edge links will practically support the rack bar on the sheave C, thereby protecting the face of the latter from wear by the sharp edges of the intermediate teeth and also preserves the form of the latter so that their efficiency will not be impaired by contact and wear against the surface of the sheave.

It will be understood that one of the pairs of rollers D and E, as, for example, the lowermost pair in Fig. 1, are driven from any suitable source of power and that any desired number of pairs of rollers corresponding thereto may be located above the same and in line therewith and with each other below the rack carrying sheave C. The power is thus transmitted directly to each pair of rollers, thereby avoiding lost motion such as would occur were a series of intermeshing gear wheels employed. Furthermore it is found that power transmitted through a flexible rack in this way is practically subjected to no loss through the gearing itself and, therefore, many pairs of rollers may be driven by a comparatively light motor.

Each pair of wheels may, of course, be made light and of small proportions, the strength required of each pair being only sufficient to resist the strains incident to its own resistance in which sense each wheel or roller is entirely independent of all others.

Having thus described my invention, what I claim as new and desire to secure by Letters Patent of the United States, is:

1. A driving mechanism embodying a flexible rack composed of a series of links pivotally connected on transverse axes intersecting the longitudinal axis of the rack, said links each having oppositely disposed tooth projections extending in opposite directions from the longitudinal center of the rack, and pairs of gear wheels arranged with the spaces between the wheels of each pair in alinement and the wheels of each pair being in mesh with the tooth projections on diametrically opposite sides of the rack.

2. In a driving mechanism, the combination with an endless flexible rack composed of a series of links pivotally connected on transverse axes intersecting the longitudinal axis of the rack, said links each embodying a plurality of oppositely disposed tooth projections extending in opposite directions from the longitudinal center of the rack, a supporting sheave on which said endless rack is suspended, and a plurality of pairs of gear wheels, the wheels of each pair meshing with the diametrically opposite tooth projections on opposite sides of the rack, said pairs of gear wheels being arranged in alinement whereby the power transmitting reach of the rack is maintained in substantially a straight line.

3. In a driving mechanism, the combination with an endless flexible rack embodying a series of links each formed with a plurality of oppositely disposed tooth projections extending in opposite directions from the longitudinal center of the rack, and edge links bridging the tooth recesses in alternate links on one side of the rack only, whereby the tooth recesses on the opposite side of the rack are left open transversely of the rack, a supporting sheave with which the edge links coöperate to support the rack in a pendent loop, and a plurality of pairs of gear wheels meshing respectively with the diametrically opposite tooth projections on opposite sides of the rack, the teeth of the gear wheels on one side of the rack being confined between the edge links.

4. An endless flexible rack embodying a series of links each having a plurality of diametrically oppositely disposed tooth projections extending in opposite directions from the longitudinal center of the rack, said links being pivotally connected together on axes coincident with the intersection of the axes of the tooth projections and longitudinal axis of the link and edge links having projections bridging the alternate tooth recesses on one side of the rack, the ends of the tooth recesses on the opposite side of the rack being open.

FRANK H. VAN HOUTEN.

Witnesses:
J. M. VAN HOUTEN,
WILLIAM T. STRIPPEL.